(12) United States Patent
Hartmann (10) Patent No.: US 8,202,031 B2
(45) Date of Patent: Jun. 19, 2012

(54) FASTENER ASSEMBLY INCLUDING A SCREW AND A CAPTIVELY ARRANGED BUSH

(75) Inventor: Gunther Hartmann, Alsfeld (DE)

(73) Assignee: KAMAX-Werke Rudolf Kellermann GmbH & Co. KG, Osterode am Harz (DE)

( * ) Notice: Subject to any disclaimer, the term of this patent is extended or adjusted under 35 U.S.C. 154(b) by 706 days.

(21) Appl. No.: 12/261,254

(22) Filed: Oct. 30, 2008

(65) Prior Publication Data

US 2009/0136318 A1 May 28, 2009

(30) Foreign Application Priority Data

Nov. 26, 2007 (DE) .................. 10 2007 047 860

(51) Int. Cl.
*F16B 21/18* (2006.01)
(52) U.S. Cl. .................. 411/353; 411/360; 411/383
(58) Field of Classification Search .................. 411/352, 411/353, 357, 360, 361, 366.1, 383, 432, 411/435–438, 517, 525–529, 927–929, 546, 411/999; 24/458; 16/2.1–2.5
See application file for complete search history.

(56) References Cited

U.S. PATENT DOCUMENTS

| 2,839,808 | A | * | 6/1958 | Zahodiakin | 411/551 |
| 3,373,648 | A | * | 3/1968 | Pitzer | 411/24 |
| 3,412,774 | A | * | 11/1968 | Schuster | 411/353 |
| 4,435,111 | A | * | 3/1984 | Mizusawa | 411/437 |
| 4,735,536 | A | * | 4/1988 | Duran | 411/353 |
| 5,489,177 | A | | 2/1996 | Schmidt, Jr. | |
| 6,227,783 | B1 | * | 5/2001 | Salameh | 411/353 |
| 6,309,157 | B1 | | 10/2001 | Amann et al. | |

(Continued)

FOREIGN PATENT DOCUMENTS

DE 199 24 502 A1 12/2000

(Continued)

OTHER PUBLICATIONS

German search report in copending, related German application No. 10 2007 047 860.9, mailed Oct. 27, 2011.

*Primary Examiner* — Victor Batson
*Assistant Examiner* — Roberta Delisle
(74) *Attorney, Agent, or Firm* — Thomas, Kayden, Horstemeyer & Risley, LLP (57) ABSTRACT

A fastener assembly (1) includes a screw (2) and a bush (3). The screw (2) includes a head (4), a shank portion (6) and a threaded portion (7) including a thread (8). The shank portion (6) is arranged to face the head (4) and the threaded portion (7) is arranged to face away from the head (4). The shank portion (6) has a diameter and the thread (8) has an outer diameter, the diameter of the shank portion (6) being smaller than the outer diameter of the thread (8). The bush (3) includes a first narrowing location (10) having a diameter being smaller than the outer diameter of the thread (8). The bush (3) is captively connected to the screw (2) by the first narrowing location (10). The bush (3) includes a second narrowing location (11) including at least one resilient element (15) being designed and arranged to elastically engage the thread (8). The bush (3) includes a slot (17) or a gap (19) being designed and arranged to continuously extend over the bush (3) in an axial direction.

14 Claims, 8 Drawing Sheets

U.S. PATENT DOCUMENTS

| | | | |
|---|---|---|---|
| 6,582,171 B2 * | 6/2003 | Bondarowicz et al. | 411/353 |
| 6,585,468 B2 * | 7/2003 | Johnson et al. | 411/353 |
| 6,685,409 B2 | 2/2004 | Braun et al. | |
| 6,688,826 B2 * | 2/2004 | Agha et al. | 411/352 |
| 2002/0098058 A1 * | 7/2002 | Caldera | 411/353 |
| 2002/0106257 A1 * | 8/2002 | Braun et al. | 411/353 |
| 2003/0108398 A1 * | 6/2003 | Sathianathan | 411/60.1 |
| 2003/0194292 A1 | 10/2003 | Deeg et al. | |

FOREIGN PATENT DOCUMENTS

| | | |
|---|---|---|
| DE | 102 15 883 A1 | 10/2003 |
| DE | 10 2005 002 603 | 10/2005 |
| DE | 10 2005 017 880 A1 | 10/2006 |
| EP | 1 055 829 A2 | 4/2000 |
| GB | 487 369 | 6/1938 |

\* cited by examiner

FASTENER ASSEMBLY INCLUDING A SCREW AND A CAPTIVELY ARRANGED BUSH

CROSS REFERENCE TO RELATED APPLICATIONS

This application claims priority to co-pending German Patent Application No. DE 10 2007 047 860.9 entitled "Verbindungselement mit einer Schraube und einer daran unverlierbar angeordneten Hülse", filed Nov. 26, 2007.

FIELD OF THE INVENTION

The present invention generally relates to a fastener assembly including a screw and a bush. More particularly, the present invention relates to a fastener assembly in which the bush is captively connected to the screw by a narrowing location.

BACKGROUND OF THE INVENTION

A fastener assembly is known from German Patent Application No. DE 102 15 883 A1 corresponding to US Patent Application No. US 2003/0194292 A1. The known fastener assembly includes a screw and a bush being captively connected to the screw. The bush is designed as a form body having a cylindrical wall which is closed in a circumferential direction, and it includes at least one flange extending outwardly in a radial direction. The screw includes a head and a shank. A threaded portion is located on the shank in a region facing away from the head, and a shank portion is located on the shank in a region facing the head. The shank portion has an outer diameter which is smaller than the outer diameter of the threaded portion. The bush includes a narrowing location having a smaller diameter than the outer diameter of the threaded portion. The narrowing location cooperates with the end portion of the threaded portion facing the head in a way to form an undercut. The undercut forms a rigid non-resilient stop. The narrowing location may be formed by a plurality of impressions which are produced after rolling the thread of the threaded portion and after having inserted the screw into the bush.

Another fastener assembly is known from German Patent Application No. DE 199 24 502 A1 corresponding to European Patent No. EP 1 055 829 and U.S. Pat. No. 6,309,157 B1. The known fastener assembly includes a screw including a head with a supporting surface and a shank. The shank includes a cylindrical shank portion and a threaded portion including a thread. The shank portion is arranged to face the head and the supporting surface of the head of the screw, respectively. The threaded portion is more or less located at the free end of the shank of the screw. The fastener assembly further includes a bush. The bush may be designed to include a slot. The fastener assembly is obtained by connecting the screw to the bush. The screw is captively arranged at the bush by a narrowing location, and it is movable in an axial direction within certain limits. The narrowing location has a smaller diameter than the outer diameter of the threaded portion. The shank portion has a comparatively small diameter, meaning a diameter which is smaller than the diameter of the thread.

A fastener assembly including a screw and a bush with a flange, the bush being captively connected to the screw, are known from U.S. Pat. No. 5,489,177. The screw and the bush are separately produced in the sense of finishing, and they are axially interconnected afterwards. When connecting them, the bush in the region of its narrowing location is mostly resiliently expanded such that it reattains a comparatively smaller diameter after having snapped over a protrusion located at the shank of the screw. In other words, the screw is designed as a special screw including a protrusion in the region between the threaded portion and the shank portion having a reduced cylindrical shape. Conventional screws including a normal shank and a normal threaded portion cannot be used in this known fastener assembly.

A fastener assembly including a screw and a bush being captively connected to the screw are known from German Patent Application No. DE 10 2005 002 603 A1. The bush is designed as a form body having a cylindrical wall being closed in a circumferential direction, and it includes at least one flange extending outwardly in a radial direction. The screw is designed as a special screw including a radially extending continuous protrusion in addition to a shank portion and a threaded portion. The protrusion is arranged in the region of the shank portion having a reduced diameter. The bush includes two narrowing locations being associated with the protrusion, the narrowing locations being spaced apart in an axial direction and cooperating with the protrusion. In this way, the screw and the bush are captively interconnected. One of the narrowing locations is axially aligned before pushing the bush over the special screw and to be radially deformable after having pushed the bush over the screw. The other narrowing location is designed to be resilient such that the cylindrical bush can be pushed over the threaded portion.

Another fastener assembly including a screw and a bush is known from U.S. Pat. No. 6,685,409 B2. The known fastener assembly includes a screw and a bush being captively connected to the screw. The bush is designed as a form body having a cylindrical wall which is closed in a circumferential direction, and it includes at least one flange extending outwardly in a radial direction. The screw includes a head and a shank. A threaded portion is located on the shank in a region facing away from the head, and a shank portion is located on the shank in a region facing the head. The shank portion has an outer diameter which is smaller than the outer diameter of the threaded portion. The bush includes a narrowing location having a smaller diameter than the outer diameter of the threaded portion. The narrowing location cooperates with the end portion of the threaded portion facing the head in a way to form an undercut. The undercut forms a rigid non-resilient stop. The narrowing location may be formed by a plurality of impressions which are produced after rolling the thread of the threaded portion and after having inserted the screw into the bush.

SUMMARY OF THE INVENTION

The present invention relates to a fastener assembly including a screw and a bush. The screw includes a head, a shank portion and a threaded portion including a thread. The shank portion is arranged to face the head and the threaded portion is arranged to face away from the head. In other words, the shank portion is arranged close to the head and between the head and the threaded portion. The shank portion has a diameter and the thread has an outer diameter, the diameter of the shank portion being smaller than the outer diameter of the thread. The bush includes a first narrowing location having a diameter being smaller than the outer diameter of the thread. The bush is captively connected to the screw by the first narrowing location. The bush includes a second narrowing location including at least one resilient element being designed and arranged to elastically engage the thread. The bush includes a separation element, meaning a slot or a gap, being designed and arranged to continuously extend over the bush in an axial direction.

The present invention also relates to pre-mounted unit including a component including a bore and at least one fastener assembly as described above. The fastener assembly is fixedly arranged in the bore of the component.

The present invention also relates to a method of producing a fastener assembly as described above.

With the novel fastener assembly, the novel pre-mounted unit and the novel method of manufacturing the fastener assembly, it is possible to separately produce the screw and the bush in a simple way and to connect them afterwards to attain the captivated fastener assembly, while axial movability of the screw with respect to the bush is substantially reduced.

The term "fastener assembly" as used in the present application is always to be understood as designating a screw and a bush being connected to form an assembly. It could also be called a "connecting unit" or a "connecting element". The bush could also be called "bushing", "casing", "sleeve" or "cylindrical tube". Such fastener assemblies are especially transported from the screw manufacturer to another manufacturer for further assembly. This manufacturer especially mounts a plurality of the fastener assemblies to a component or part, especially a cover, a hood, and the like, to attain a pre-mounted unit. The pre-mounted unit includes a component and at least one mounted fastener assembly, usually a plurality of mounted fastener assemblies. The pre-mounted unit is then further transported, for example to an automobile manufacturer. The pre-mounted unit is then connected to another component in a production line of the manufacturer. Especially, the other component may be a lower part, such as a cylinder block, a transmission case and the like. During this final assembly, the screws of the fastener assemblies of the pre-mounted unit are introduced into bores being located in the associated other component. Especially, they are screwed into threaded bores being located in the other component.

It has been found out that it is desirable in certain applications of the fastener assembly that the screw is positioned in the bush such that the screw with its free end facing away from the head does not protrude out off the bush. For example, such an application is a pre-mounted unit in which the bush has been pressed into a bore of a first component. This pre-mounted unit is to be connected to a second component during final assembly, especially by a plurality of fastener assemblies. Due to the novel defined position of the screw with respect to the bush resulting from contact of the screw to the second narrowing location of the bush, it is possible to freely move and position, respectively, the pre-mounted unit over the second component. Any damages of the assembly surface of the second component caused by the free ends of the screws are prevented in a reliable way.

The novel fastener assembly includes two narrowing locations being located at the bush. One of the narrowing locations is designed to be non-resilient, while the other narrowing location is designed to be resilient. Both narrowing locations cooperate with the threaded portion being located at the screw, and they are coordinated with the threaded portion in a special way.

The first narrowing location together with the end portion of the threaded portion facing the head of the screw forms a pair of stops in the sense of a stop and a counter stop. The pair of stops ensures the captive and captivated, respectively, arrangement, it is effective in this direction, and it cannot be overcome by forces usually occurring.

The second narrowing location is designed to be elastic and resilient, the free ends of the resilient elements of the narrowing location passing by the tips of the thread of the threaded portion in the sense of a ratchet. This at least applies in the direction when the screw is partly pulled or pushed out off the bush. This outwardly directed movement is limited by contact of the pair of stops of the first narrowing location. In this way, the limited axial movability known from the prior art is eliminated or at least further reduced. In the other direction, meaning when further pushing the screw into the bush, such a movement may either be allowed or prevented depending on the design of the free ends of the resilient elements. In case the free ends are designed similar to barbs, this movement is prevented such that during final assembly the screw can only be moved out off the bush by a rotational movement in an advantageous way.

It is especially preferred to use normal screws in contrast to screws having a special design for realizing the captive arrangement. The screws screws include a head, a shank portion and a threaded portion and usually a centering portion being located at the free end. Both narrowing locations of the bush cooperate with portions of the threaded portion, especially with such portions of the threaded portion facing the head of the screw. The non-resilient narrowing location may be arranged to engage in the portion of the thread runout of the threaded portion facing the head of the screw. It may also be advantageous to arrange the resilient narrowing location such that it contacts a portion of the threaded portion being located close to the head of the screw. The non-resilient or rigid narrowing location of the screw realizes the captive arrangement between the bush and the screw of the fastener assembly, and it preferably is designed in a way that usually occurring forces and loads do not lead to the screw being detached from the bush, meaning the screw fully exiting the bush.

The second narrowing location is designed to be resilient, and for this purpose it includes one or more elastic elements being designed to be elastically deformable in a radial direction. Usually, the second narrowing location includes a plurality of such elements the free ends of which engaging the outer thread of the threaded portion more or less in a radial direction or in an inclined direction in the sense of a frictional connection and/or a positive fit. This engagement may be especially determined by the design of the force of the spring with which the resilient elements engage the threads of the threaded portion.

Another influencing variable is the design of the free ends of the resilient elements. For example, the free ends may be designed to be sharp-edged, for example complementary to the design of the threads of the threaded portion. However, for example, the free ends of the resilient elements may also be designed to be rounded. Such a rounded shape reduces damages of the threads of the threaded portion during axial movement occurring between the screw and the bush. A sharp-edged design of the free ends of the resilient elements in connection with a great force of the spring, meaning an especially stiff design of the resilient elements, may be used to prevent the screw being further pushed through the bush by a pure axial force during final assembly. Instead, the screw can only be moved in a direction to exit the bush by a rotational movement. For example, the screw may then enter a respective bore of the associated other component. Depending on the design, it is also possible to make use of a compromise in which a limited axial force acting on the screw during final assembly is sufficient to introduce the screw into the bore, especially a threaded bore, of the associated other component without damaging the beginning of the threads of the threaded bore in the other component by the screw. It is also possible that the second narrowing location with its resilient elements forms barbs for the end of the thread facing the head, the barbs facing in a rear direction. The resilient elements may also be designed as elastic tongues.

The bush of the novel fastener assembly includes a separation element being designed to be continuous in an axial direction. The term "separation element" as used herein is to be understood as both covering a slot and a gap being located on the surface line of the bush and being directed in an axial direction or inclined in a continuous way. A "slot" is to be understood as an interruption of the material of the bush in a circumferential direction, the separate ends of the strip of material resulting form the interruption being arranged more ore less close to one another, meaning with no or at least no substantial distance. Such a design only allows for substantial radial movement of the separate ends of the bush in a radial outward direction. A "gap" is to be understood as an interruption of the material of the bush in the same direction, but the ends of the material of the bush having a substantial distance between them. In case the bush includes a gap, the ends of the material can be moved in a radial direction with respect to one another in both directions, meaning in a radial outward direction and in a radial inward direction. This property can be used to compensate tolerances of the diameters of the bores in the component to be mounted. For example, if the component to be mounted is a hood, it may especially be made of plastic such that the bores in addition to different diameters due to tolerances also include draft angles. All this and more may be compensated by the resilient properties of the bush.

No matter if the bush of the fastener assembly includes a slot or a gap, manufacture of the bush for the fastener assembly is comparatively easy. The bush may be formed as a plain strip of sheet metal, especially made of metal, especially by punching and stamping. The elements of the two narrowing locations may already be formed during this process. The elements may be formed into the strip of material in its plain shape by using counter supports such that the narrowing locations can be produced within comparatively small tolerances. In the following, the prepared strip of material and section of material, respectively, is rolled to attain the shape of a raw bush. This raw bush is characterized by the two ends of the strip of material facing each other still having a greater distance than the finished bush of the fastener assembly. In other words, the raw bush has a greater gap. The greater gap is designed in a way that the screw can be introduced and pushed, respectively, into the interior of the raw bush without the tips of the threads of the threaded portion contacting the inner wall of the bush and especially the future narrowing locations. Introducing the screw into the raw bush may be especially realized in a way that the narrowing locations of the bush do not face the threaded portion, but instead the shank portion of the screw. The diameters of the bush are decreased by a following squeezing movement, each of the two narrowing locations being then located at a smaller diameter such that they become active. All this may be achieved without the narrowing locations contacting the shank portion. The squeezing deformation either deforms the comparatively greater gap to attain a slot or a smaller gap at the bush.

In this position, the bush only covers a part of the threaded portion. The fastener assemblies in the transportation position may be transported to the manufacture of the component to be mounted. The loads acting upon the fastener assemblies are comparatively low during transportation. However, it is also possible that the screw is axially displaced with respect to the bush already at the manufacture of the fastener assembly or at the manufacturer of the component to be mounted such that the shank portion of the screw further exits the bush and the entire threaded portion of the screw or at least a substantial part is located inside of the bush. During this movement, the free ends of the resilient elements of the second narrowing location slide over the threads being located close to the head of the screw, especially over the thread runout facing the head of the screw.

Depending on whether the free ends of the resilient elements are designed to be sharp-edged or rounded, there may be an acceptable slight damage of the threads which does not have a substantial negative influence. It is more important that the limited axial movability between the screw and the bush in this position of the fastener assembly is either substantially reduced or even completely eliminated. Theoretically, the maximum axial movability is the pitch of the thread of the threaded portion.

Vibrations and forces occurring during assembly of the pre-mounted component and during handling of this component during final assembly at the other respective component cannot lead to the screws completely exiting from the bushes and being detached from the bushes, respectively. Each screw is also secured against a rotational movement due to the two narrowing locations and the frictional forces resulting therefrom. However, these forces can be overcome when screwing the screw into the other associated component. Depending on the above described design and sizing of the elastic force of the resilient elements and the shape of the free ends of the resilient elements engaging the outer thread of the threaded portion, during final assembly, a screw of the fastener assembly may be specifically pushed into the bush and into the entrance of a bore, especially a threaded bore, being located in the associated component by respective axial force without damaging the beginning of the thread of the threaded bore. However, it is also possible to design the resilient elements to be comparatively stiff and the free ends of the resilient elements to be comparatively sharp-edged. Especially, the resilient elements may be designed as barbs to prevent the possibility of pushing the screw into the bush during final assembly due to a pure axial force and to allow for axial movement of the screw out off the bush and entrance into the bore in the respective associated component exclusively due to a rotational movement of the screw. Due to this rotational movement of the screw, the screw with its threaded portion is simply moved with respect to the resilient elements of the second narrowing location by screwing.

In case the bush has a greater axial length than the threaded portion of the screw, there is the possibility of the bush completely covering the threaded portion.

The resilient elements forming the second narrowing location may be located close to the first narrowing location as seen in an axial direction such that both narrowing locations cooperate with the end portion of the threaded portion facing the head of the screw. It is especially advantageous if the first narrowing location cooperates with the thread runout of the threaded portion facing the head of the screw and the second narrowing location cooperates with the beginning of the thread close to the thread runout facing the head of the screw such that most parts of the threaded portion never contact the two narrowing locations at any time such that damages of the thread are prevented. The elements forming the first and second narrowing location may be arranged in a spaced apart manner about the circumference of the bush in a way to partly or completely overlap in an axial direction to be capable of arranging the two narrowing locations as close as possible with respect to one another in an axial direction.

At least of the free ends of the resilient elements of the second narrowing location of the bush are distributed in a spaced apart manner axially corresponding to the pitch of the thread of the threaded portion, there is the possibility of a plurality of the free ends of the resilient elements of the second narrowing location entering the thread of the threaded portion at the same time such that the remaining relative movability of the screw with respect to the bush is limited to a distance which at least is smaller than the width of a thread. Due to a slight rotational movement after axial displacement of the screw with respect to the bush, it is even possible to attain a fixed position of the screw at the bush in the mounted fastener assembly, meaning to completely eliminate the limited axial movability of the screw with respect to the bush of the fastener assembly.

There are a number of different possibilities of designing the first narrowing location. Some of these possibilities are illustrated in the exemplary embodiments. However, it is also possible to use different designs of the first narrowing location. The elements of the first and/or of the second narrowing location may be designed in a way that they are a feature of the bush which can be seen from the outside and which serves to automatically determine the orientation of the bush with respect to the screw when connecting the screw and the bush, meaning when producing the fastener assembly. Especially when using an automatically conducted squeezing process, the bushes need to be fed to the screws and the elements need to be interconnected at the correct orientation. Alternatively and/or additionally, it is possible to use one or more features changing the diameter, for example imprints, beads or bevels extending over the entire circumference or at least a substantial part of the circumference of the bush to improve automatic determination of the orientation of the bushes.

The resilient elements of the second narrowing location of the bush may be arranged with respect to the first narrowing location of the bush, the axial lengths of the threaded portion and of the bush and the respective relevant dimensions of the pre-mounted component and of the associated other component such that during final assembly the beginning of the thread of the threaded portion engages a threaded bore in the respective associated component only after the threaded portion having been released from the second narrowing location. This allows for easy introduction of the threaded portion into the threaded bore in the associated component and for compensating manufacturing tolerances. However, in some cases, it is not critical if these dimensional relations are not fulfilled and the beginning of the thread of the threaded portion already enters the threaded bore in the associated component when the threaded portion still contacts the second narrowing location. Due to the fact that the second narrowing location is designed to be resilient, tolerances may be compensated and final assembly can be securely accomplished.

As mentioned before, the present invention also relates to a novel method of producing the fastener assembly. In this way, one attains an especially well-priced possibility of manufacturing the bush and thus the fastener assembly. The screw may be a screw having a usual design only including a shank portion and a threaded portion. It is not necessary to use special screws including special continuous protrusions since the two narrowing locations cooperate with the threaded portion. Preferably, the elements of the two narrowing locations are already produced in the plain condition of the strip of material, meaning a strip of material from which the raw bush is formed by rolling. It is especially advantageous if the plain strip of material cooperates with counter bearings such that the dimensions of the elements of the two narrowing locations can be produced within small tolerances and in an easy way. It is to be understood that the squeezing process is conducted with the required precision to attain the reduced diameters at the two narrowing locations of the bush when the screw and the bush are connected to each other in a captivated way.

Such a squeezing process is preferably conducted in such a relative position of the screw with respect to the raw bush in which the two narrowing locations of the shank portion face each other. The squeezing process is not negatively influenced by the insecurity of a contact with the threaded portion of the screw. Instead, after having accomplished the squeezing process in the above described relative position, the screw is pressed out off the bush until there is a first contact of the first narrowing location at the threaded portion. It is to be understood that the resilient elements of the second narrowing location snap over the beginning portion of the threaded portion facing the head of the screw. Then, one attains a secured relative position between the screw and the bush in which the relative movability between the screw and the bush is limited in a way that it is smaller than the pitch of the thread of the threaded portion of the screw. Alternatively, it is also possible to conduct the squeezing process in a relative position in which the narrowing locations at the raw bush face the threaded portion in the predetermined relative position. However, in such a case it needs to be made sure that the squeezing process does not lead to deformation of the threads of the threaded portion.

The limited axial movability of the screw with respect to the bush may at least be substantially reduced in the transporting and handling position of the pre-mounted unit before final assembly.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
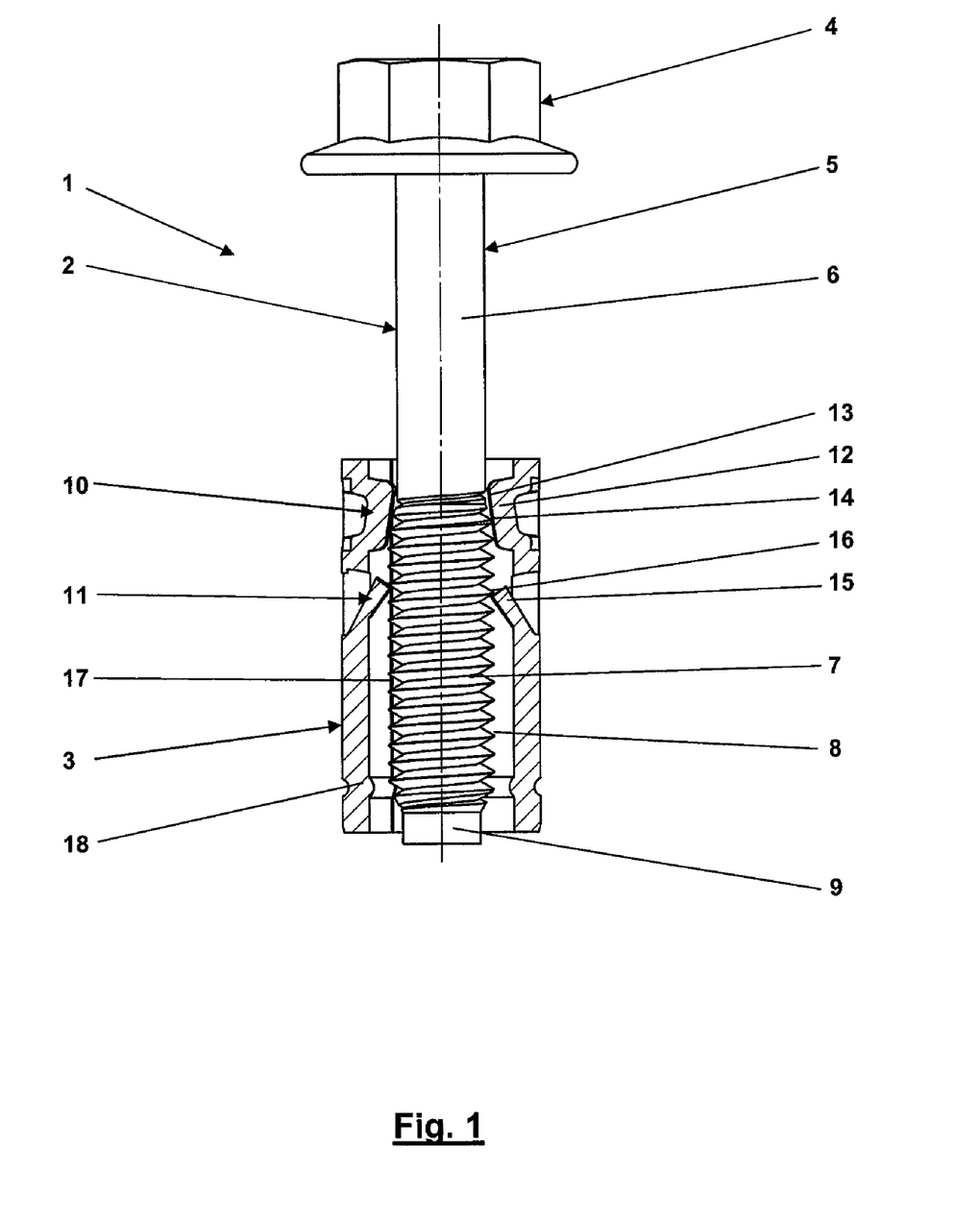
FIG. 1 is a sectional view of a first exemplary embodiment of the novel fastener assembly.

Referring now in greater detail to the drawings, FIG. 1 illustrates a first exemplary embodiment of a novel fastener assembly 1 including a screw 2 and a bush 3.

The screw 2 includes a head 4 and a shank 5. The screw 2 has a usual design. The screw is made of metal, especially steel. Especially, it is a high-tensile screw 2. The head 4 includes an engagement surface for a tool and a contact surface. The shank 5 includes a cylindrical shank portion 6 and a threaded portion 7, the outer diameter of the shank portion 6 being smaller than the outer diameter of the threaded portion 7 including a thread 8. In the illustrated example, the thread 8 is designed as a metric thread. The shank 5 may end in a centering portion 9. It is to be seen that the shank portion 6 is located at the screw 1 in a way to face the head 4, while the threaded portion 7 is arranged in a way to face away from the head 4.

The bush 3 is designed to be substantially annular. The bush 3 is made of metal, especially sheet metal. Preferably it is made of a plain section of sheet metal from which the bush 3 is then formed by rolling. To be exact, one attains a raw bush after rolling the sheet metal, the raw bush having an inner diameter still being greater than the outer diameter of the thread 8 such that during manufacture of the fastener assembly 1 the screw 2 can be introduced into the bush 3. Afterwards, a squeezing or pressing process is realized in a radial direction, this process reducing the inner diameter of the bush 3. This may be realized in the region of the shank portion 6, but it may also be realized in the relative position illustrated in FIG. 1. No matter what process is chosen, one attains a fastener assembly 1 including a screw 2 and a bush 3 being captively connected.

In contrast to the screw 2, the bush 3 has a special design. The bush 3 includes a first narrowing location 10 and a second narrowing location 11. The first narrowing location 10 includes a plurality of impressions 12 being arranged in a spaced apart manner about the circumference of the bush 3. The impressions 12 form protrusions protruding in an inward direction. For example, it is possible to arrange three or four impressions 12 which are uniformly distributed about the circumference. The impressions 12 at their side protruding in an inward direction may form surface elements 13 which together form a conical element surrounding the thread runout 14 of the threaded portion 7 facing the head 4 of the screw, as this is explained in greater detail in German Patent Application No. DE 102 15 883 A1 corresponding to US Patent Application No. US 2003/0194292 A1. The impressions 12 cooperate with the thread runout 14 as a fixed pair of stops, or at least with some part of the threaded portion 7 which needs to be located at the screw 2 anyway. The size and arrangement is chosen such that in the assembled position of the fastener assembly 1 as illustrated in FIG. 1 the screw 2 cannot be pulled or pressed further out off the bush 3. In this way, the first narrowing location 10 functions as a fixed, insuperable stop.

The second narrowing location 11 is designed to be elastic and resilient, and it includes at least one resilient element 15, preferably a plurality of resilient elements 15 also being distributed about the circumference of the bush 3. The resilient elements 15 may be designed to protrude from the material of the bush 3 similar to tongues. Their free ends 16 in the illustrated example are designed to be sharp-edged and barb-like, respectively, and they engage into the thread 8 of the threaded portion 7 with frictional engagement and/or a positive fit. The resilient elements 15 also cooperate with the threaded portion 7 such that they counteract with the threaded portion 7 which has to be arranged at the screw 2 anyway, meaning without having to use a screw 2 with a special design.

It is to be understood that the design of the elements of the first narrowing location 10 and of the second narrowing location 11 preferably can be realized by punching or pressing acting upon the sheet material still being in its plain configuration, meaning in a position operating with counter bearings such that the design and arrangement of the elements of the first narrowing location 10 and of the second narrowing location 11 can be realized within small tolerances.

Winding the plain metal sheet to attain the raw bush is realized in a way that one attains a gap between the ends of the metal sheet facing each other and such that the inner ends of the impressions 12 and of the resilient elements 15 are located at diameters being greater than the outer diameter of the thread 8 of the threaded portion 7. In this position, the screw 2 and the bush 3 are pushed into one another, and the bush 3 is squeezed or pressed such that the gap being located at the bush 3 is deformed to a slot 17. During this movement, the impressions 12 and the resilient elements 15 are simultaneously moved such that they have a different diameter being less than the outer diameter of the thread 8 of the threaded portion 7. In case the squeezing process is realized while the raw bush faces the shank portion 6, it is then possible to partly push the screw 2 out off the bush 3 until the impressions 12 of the first narrowing location 10 contact the thread runout 14. The free ends 16 of the resilient elements 15 of the second narrowing location 11 are resiliently deformed, and they are moved over the tips of the threads similar to a ratchet until they reach the relative position illustrated in FIG. 1. The position illustrated in FIG. 1 may be used as the transporting position of the fastener assembly 1. It is to be seen that the narrowing location 10 as well as the narrowing location 11 are arranged in an upper region, meaning at the end of the bush 3 facing the head 4 of the screw 2. In this way, the bush 3 may protect and surround the entire threaded portion 7 and the thread 8 can be protected during transportation. There are additional advantages which will be explained with respect to the following drawings. However, pushing or pulling the screws 2 out off the bush 3 after having assembled the fastener assembly 1 may also be realized during further processing of the fastener assembly 1.

Concerning the design of the first narrowing location 10 and/or the second narrowing location 11, the bush 3 may be designed such that the design of these elements at the same time is a feature of the bush 3 which serves for automatic determination of the orientation of the bush 3 in an automatically operated assembly machine for realizing captive connection of the screw 2 and the bush 3. On the other hand, it is also possible that the bush 3 includes a protrusion 18 especially protruding in an inward direction such that this feature may be used for automatic determination of the orientation of the bush 3. It is to be understood that the inner diameter of the protrusion 18 still is substantially greater than the outer diameter of the thread 8 such that the protrusion 18 does not negatively influence correct functionality of the narrowing locations 10 and 11.

The length of the bush 3 preferably is greater than the length of the threaded portion 7. It is to be seen in FIG. 1 that a part of the centering portion 9 protrudes out off the bush 3. However, the lengths may also be chosen such that this is not the case.

Figure 2:
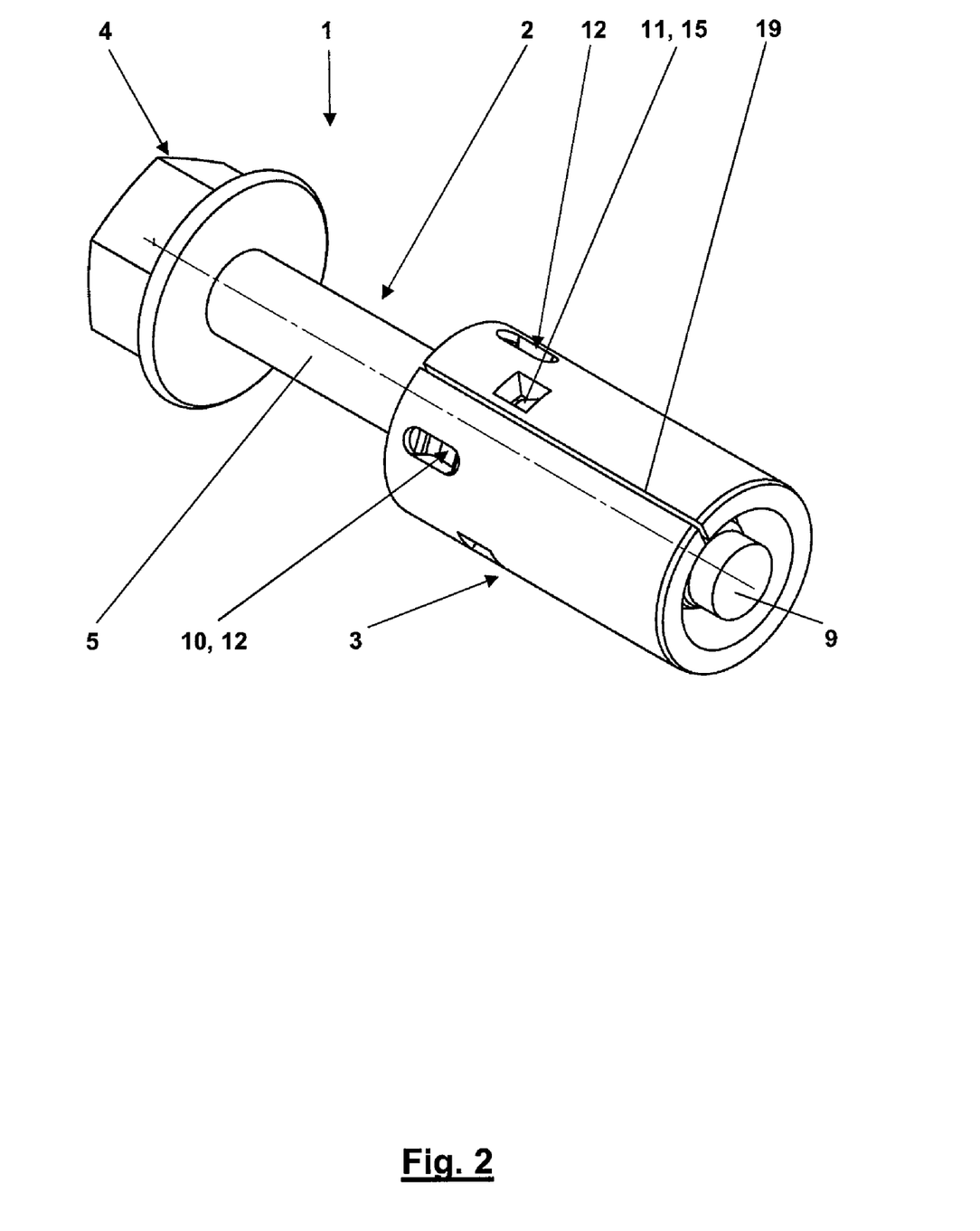
FIG. 2 is a perspective view of a second exemplary embodiment of the novel fastener assembly.

FIG. 2 illustrates a second exemplary embodiment of the novel fastener assembly 1 including the screw 2 and the bush 3. Once again, the mounted position of the fastener assembly 1 is illustrated. In contrast to the exemplary embodiment of FIG. 1, the impressions 12 forming the first narrowing location 10 and the resilient elements 15 forming the second narrowing location 11 are not located at different axial locations as in FIG. 1, but instead to overlap in an axial direction. This means that the two narrowing locations 10 and 11 are located even closer to the end of the bush 3 facing the head 4 of the screw 2. This arrangement intends to limit any possible damages of the tips of the thread 8 to the end portion of the threaded portion 7 facing the head 4 of the screw 2, especially the thread runout 14. Such damages may result from movement between the screw 2 and the bush 3, especially when using free ends 16 of the resilient elements 15 having a sharp-edged design. Consequently, such "damages" do not negatively influence the functionality of the screw after the final assembly. It is to be understood that this effect may also be realized by other measures, for example by the shape of the free ends 16, the axial length of the resilient elements 15, the chosen diameters and the chosen elastic force, to attain a fastener assembly 1 fulfilling the requirements as desired.

FIG. 2 in contrast to the embodiment of the fastener assembly 1 in FIG. 1 also illustrates that the design and arrangement of the first narrowing location 10 and of the second narrowing location 11 are coordinated with the radial pressing movement of the bush 3 for realizing captive connection to the screw 2 in a way that there is a gap 19 instead of the slot 17. Such a gap 19 allows for a resilient radial movement of the bush 3 in both directions.

Figure 3:
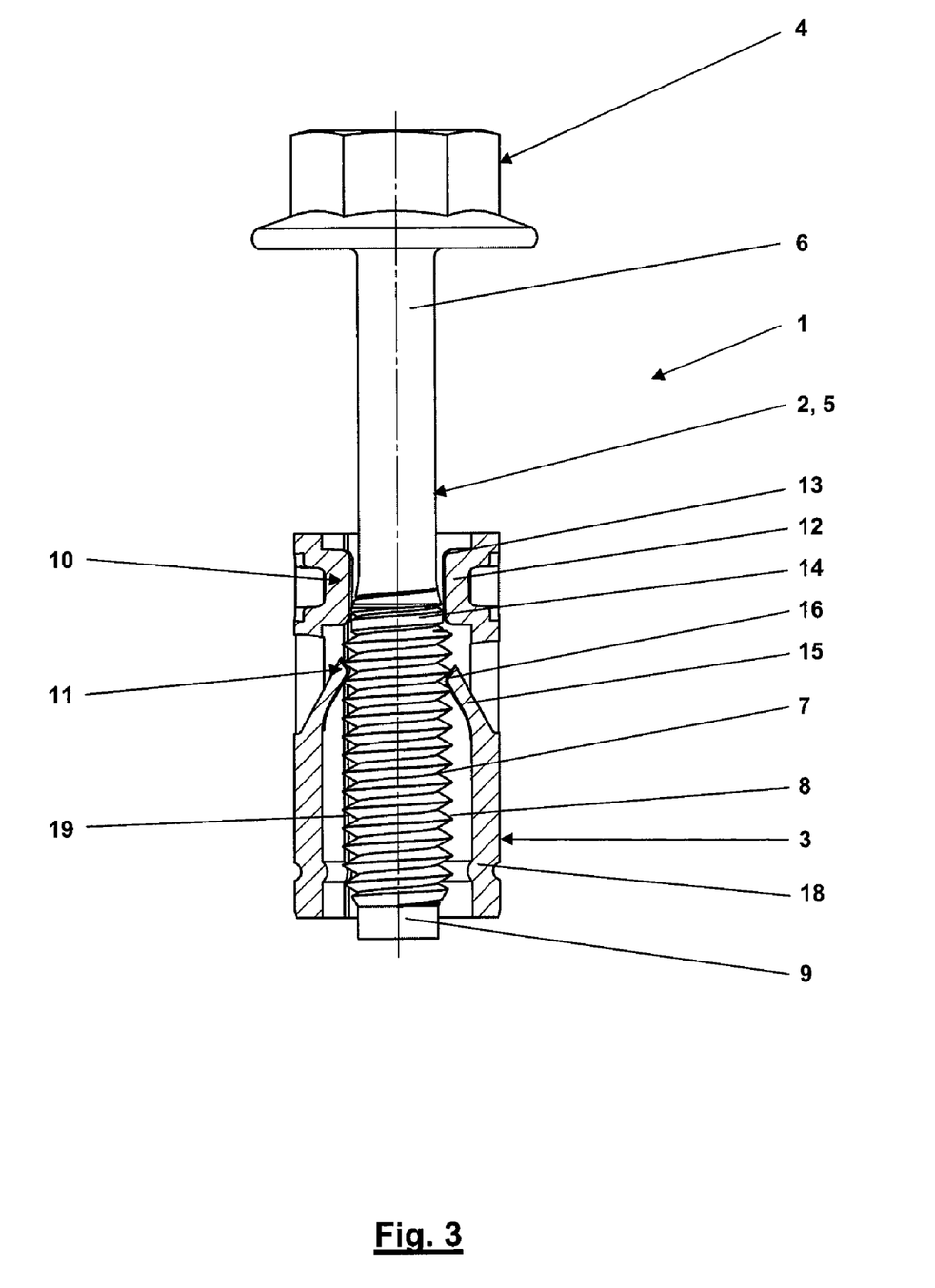
FIG. 3 is a sectional view of a third exemplary embodiment of the novel fastener assembly.

The exemplary embodiment of the fastener assembly 1 illustrated in FIG. 3 is similar to the one illustrated in FIG. 1. In contrast thereto, the substantial diameter of the shank portion 6 is designed to be comparatively smaller, meaning the shank portion 6 is designed to be reduced. The design of the two narrowing locations 10 and 11 is also slightly different. The surface elements 13 of the impressions 12 are located at a substantially smaller surrounding angle or envelope angle, or they are even designed to be aligned in an axial direction. Accordingly, the thread runout 14 or a part thereof has a reduced diameter being produced by rolling such that there is a discontinuous transition region with respect to the remaining parts of the thread 8 of the threaded portion. In this way, one attains a pair of stops at the narrowing location 10 which cannot be overcome by usually occurring forces. The resilient elements 15 or tongues forming the second narrowing location 11 in this case are designed to be comparatively longer to simplify resilient inward movement, meaning to realize a decreased elastic force. In addition, the free ends 16 are not designed to be sharp-edged or barb-like, but instead to be rounded to allow for an easier sliding movement over the tips of the threads without damaging them when partly pushing the screw 2 out off the bush 3. It is to be understood that this exemplary embodiment is also suitable to realize screwing in of the screw 2 during final assembly by first realizing a pure axial stroke for introducing the centering portion 9 into the threaded bores of the other component and to then conduct the screwing process. FIG. 3 also shows that one attains a gap 19 after deformation of the raw bush to the bush 3, the gap 19 serving to realize reasonable compensation of tolerances.

For example, it is sufficient in this exemplary embodiment to choose the force of the resilient elements 15 such that they provide sufficient friction counteracting rotation of the screw 2. This means that the forces occurring during transportation cannot lead to a rotational movement between the screw 2 and the bush 3 such that, if desired, the entire threaded portion 7 may be permanently protected by the bush 3. The reduction of the diameter of the shank portion 6 results in an increased radial clearance or play which can be used when screwing the screws 2 to attain the final assembly position.

Figure 4:
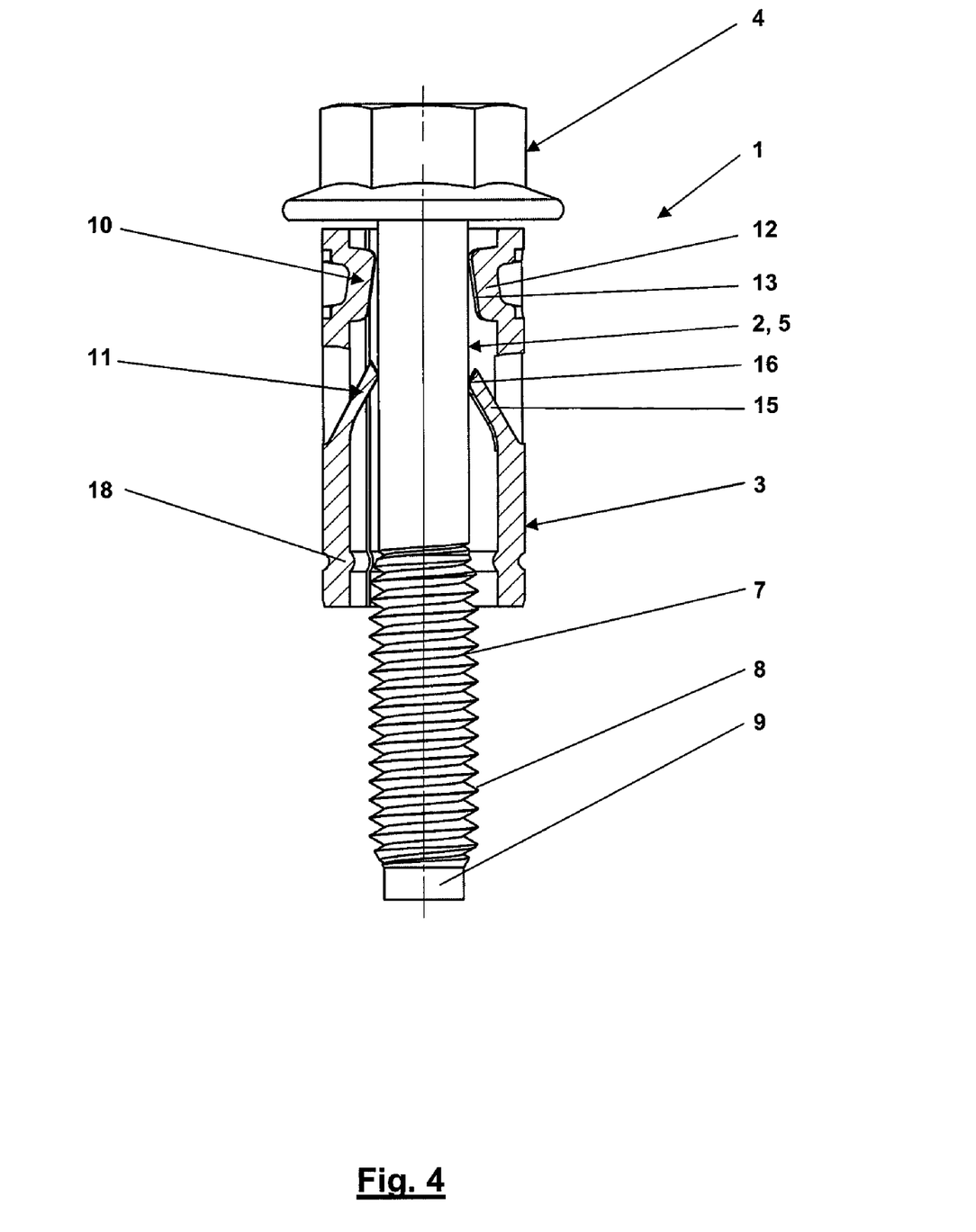
FIG. 4 is a sectional view of a fourth exemplary embodiment of the novel fastener assembly.

FIG. 4 illustrates another exemplary embodiment of the novel fastener assembly 1. In this case, the first narrowing position 10 is designed as in FIG. 1, but the second narrowing position 11 is designed as in FIG. 3. In all of these exemplary embodiments, the resilient elements 15 with their free ends 16 are designed and arranged such that the free ends 16 end in a way to correspond to the pitch of the thread 8 such that they can enter the impression of the thread 8 of the threaded portion 7 about the circumference more or less at the same time. This design and arrangement may even be used to realize a slight relative rotational movement between the screw 2 and the bush 3 after an axial movement of the screw 2 with respect to the bush 3 during assembly of the fastener assembly 1. This serves to completely eliminate the limited axial movability and to connect the screw 2 and the bush 3 in a fixed way to attain a fixed fastener assembly 1. However, it is preferred to conduct the radial pressing movement of the raw bush for attaining the bush 3 in a relative position as this is illustrated in FIG. 4. The final relative position between the screw 2 and the bush 3 is then either attained at the manufacture of the fastener assembly 1 or at the manufacturer of the pre-mounted unit.

Figure 5:
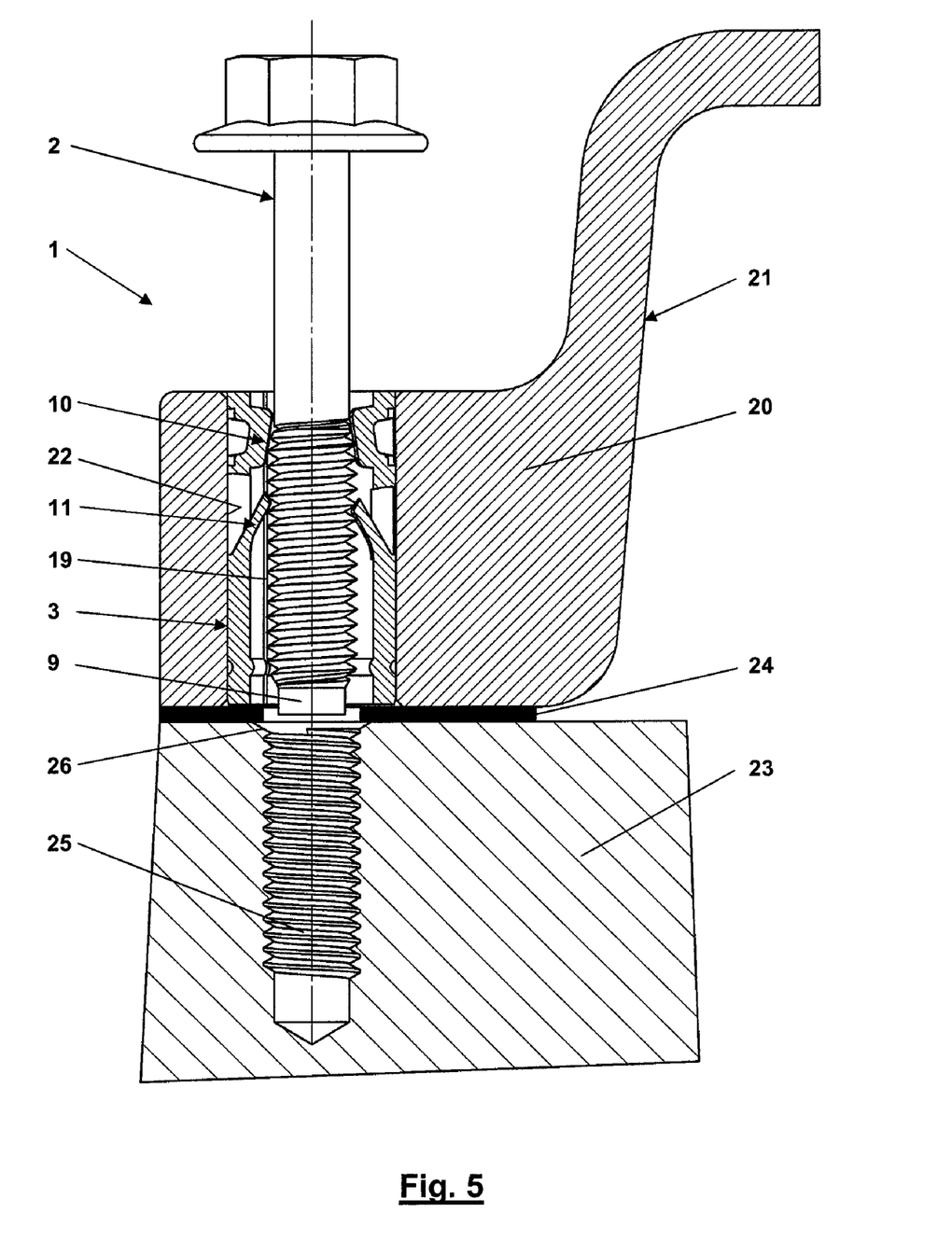
FIG. 5 is a sectional view of the novel fastener assembly and the associated elements during final assembly before rotating the screw.

FIG. 5 in its upper portion illustrates a component 20 which is connected to a plurality of fastener assemblies 1 for producing a pre-mounted unit 21. For this purpose, each of the bushes 3 of the fastener assemblies 1 with the captively connected screws 2 are pressed into bores 22, the resilient capacity of the bush 3 being used to compensate for tolerances. This especially applies when the component 20 is made of plastic and if the bores 22 include draft angles. For example, the pre-mounted units 21 are then transported from the manufacturer of the pre-mounted units 21 to an automobile manufacturer. The automobile manufacturer then permanently connects the pre-mounted unit 21 with another component 23, for example a lower part, under intermediate arrangement of a seal 24. It is to be seen in FIG. 5 that the threaded portion 7 may also be protected in this position and that there a no damages being caused by a relative displacement of the pre-mounted unit 1 with respect to the other component 23 in the region of the separation plane. The other component 23 includes threaded bores 25 or other bores being arranged in a respectively coordinated way and preferably including a bevel 26 at their end facing the seal 24.

Figure 6:
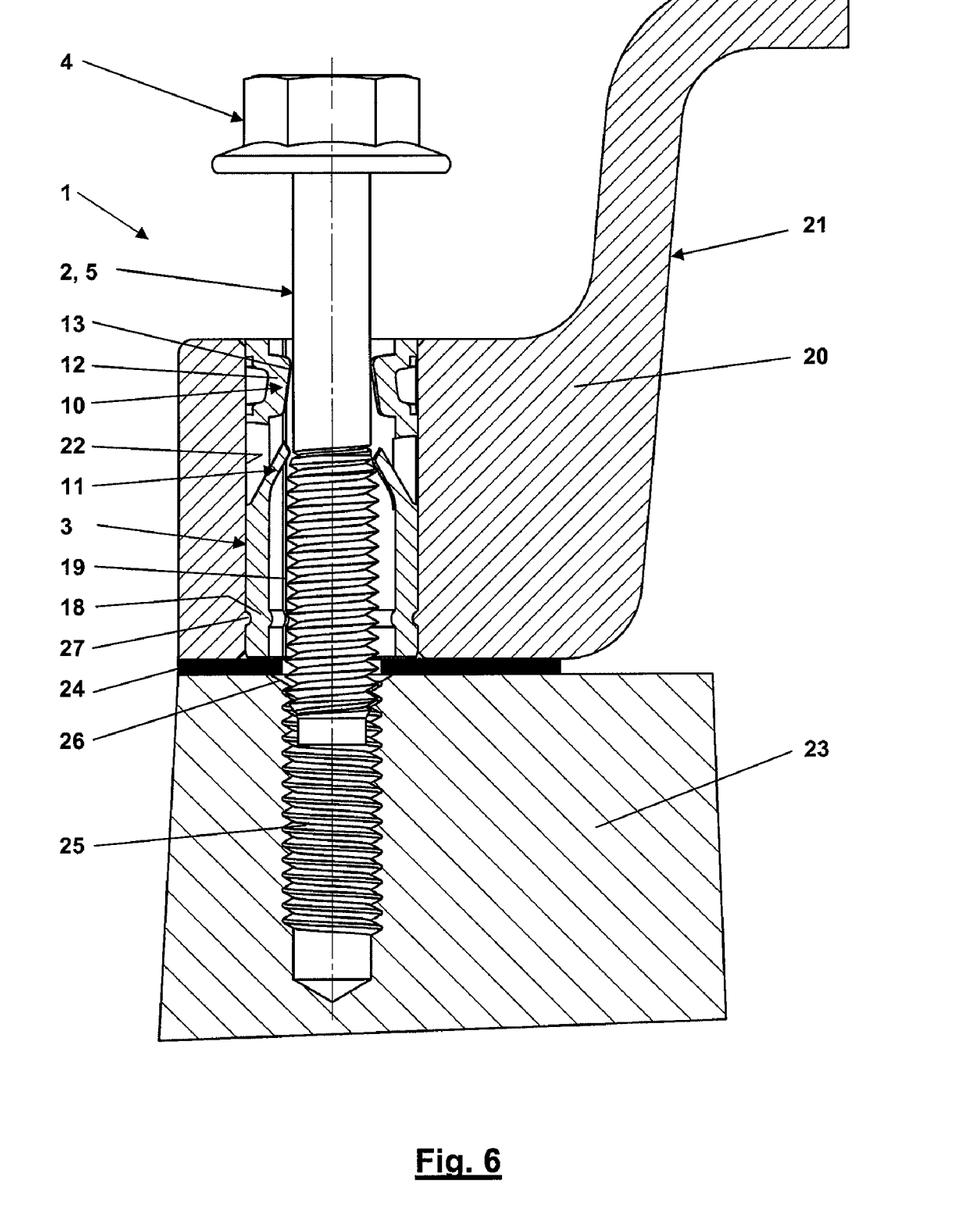
FIG. 6 is a sectional view of the novel fastener assembly and the associated elements during final assembly after having begun rotating of the screw.

The further steps of the final assembly can be seen by a comparison of FIGS. 5 and 6. The change from FIG. 5 may be realized such that the screw 2 of each fastener assembly 1 is further pressed down by a pure axial insertion process, the centering portion 9 entering the threaded bore 25 without the threads of the threaded portion 7 contacting the threads of the threaded bores 25. This is possible since the rounded free ends 16 of the resilient elements 15 allow for such axial displacement. It is to be understood that when designing the free ends 16 as sharp-edged barbs as illustrated in FIG. 1, such a pure axial movement is not possible. Instead, the axial downward movement of the screw 2 has to be replaced by a rotational movement, meaning a screwing movement of the screw 2 out off the bush 3 in a downward direction while entering the threads of the threaded bore 25.

FIG. 6 also illustrates that the inwardly protruding protrusion 18 forming a channel on the outside of the bush 3 cannot only be used for determination of the orientation when producing the fastener assembly, but that the bore 22 includes a continuous protrusion 27 in axial orientation to the continuous channel of the protrusion 18 such that the axial position of the bush 3 and of the fastener assembly 1 in the component 20 is determined. In connection with the illustration and arrangement of the two narrowing locations 10 and 11 with respect to one another according to FIG. 2 and the illustration of FIGS. 5 and 6, it is to be seen that the design and arrangement may be chosen such that the order of the threaded portion 7 being detached from the second narrowing location 11 during final assembly can be determined. For example, the design and arrangement may be chosen such that the threaded portion 7 is detached from the second narrowing location 11 before the first thread of the thread 8 contacts the thread in the threaded bore 25 of the other component 23. In case the resilient elements 15 include rounded free ends 16, it is also possible to realize an overlapping situation between the threaded portion 7 exiting the second narrowing location 11 and entering the thread of the threaded bore 25.

Figure 7:
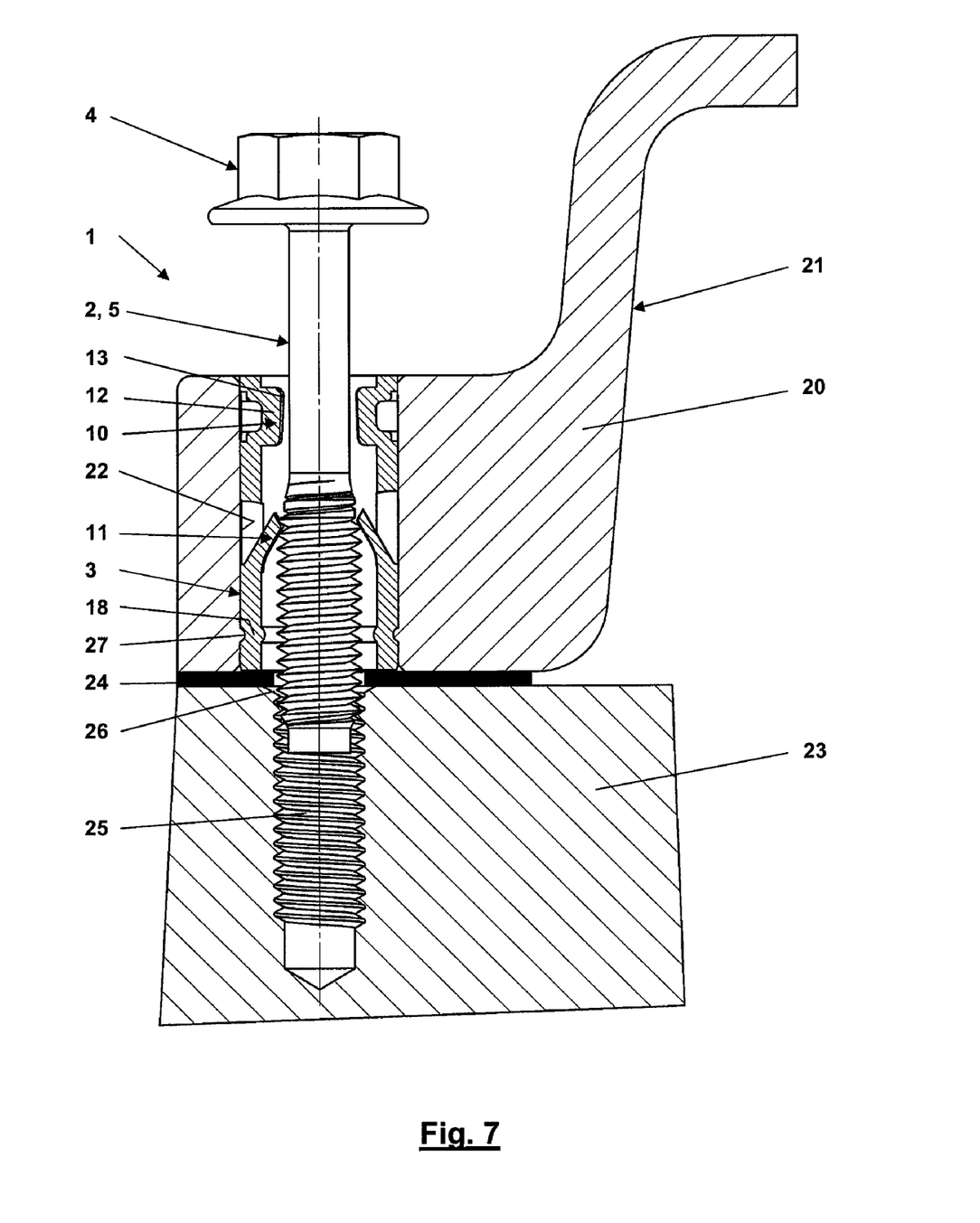
FIG. 7 is a sectional view of a fifth exemplary embodiment of the novel fastener assembly during final assembly after having begun rotating of the screw.

It may make sense to choose such an overlapping arrangement as this is illustrated in FIG. 7, FIG. 7 also illustrating a design of the fastener assembly 1 as it has already been illustrated in FIG. 3. However, this also applies to the other exemplary embodiments of the fastener assembly 1.

Figure 8:
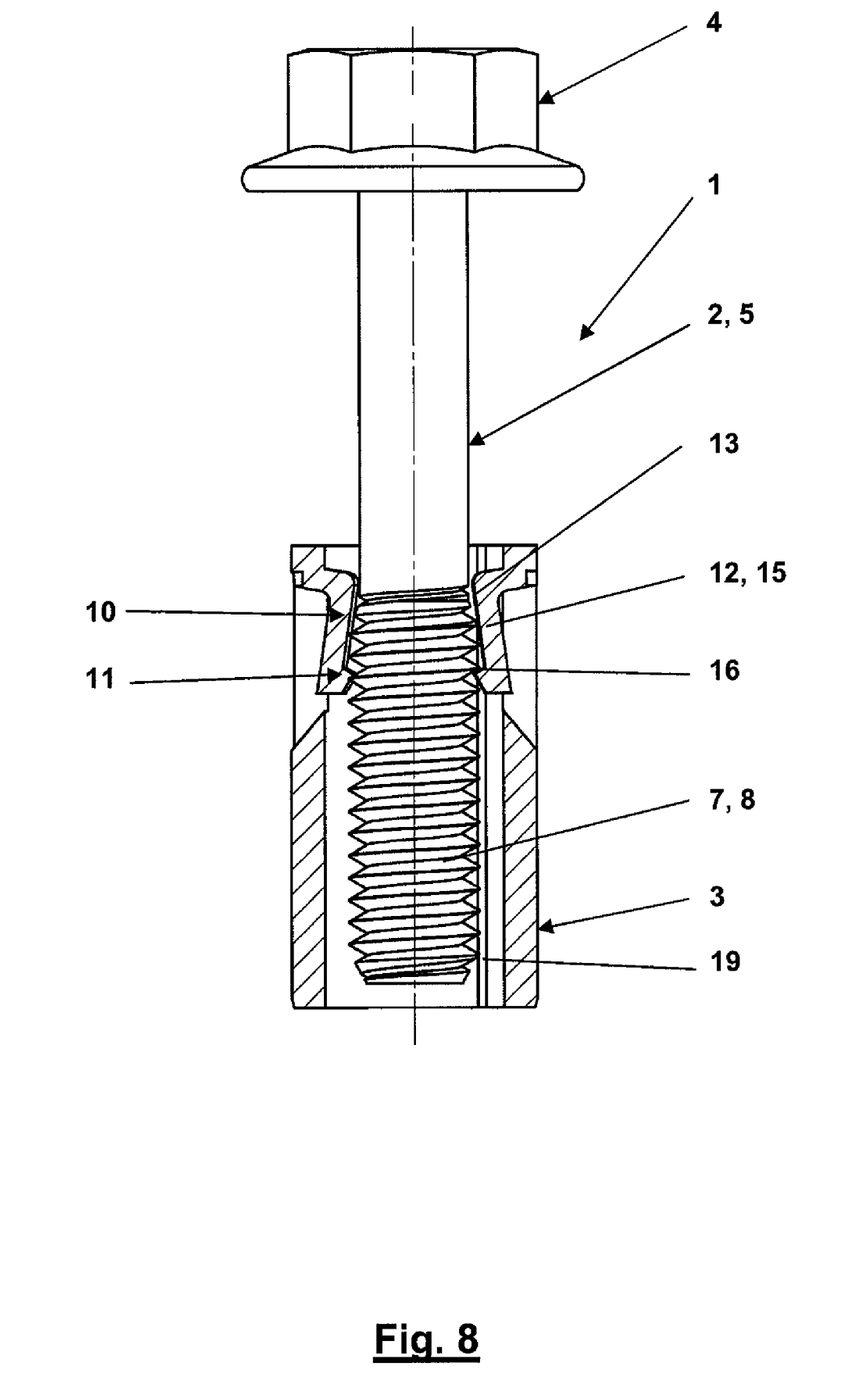
FIG. 8 is a sectional view of a sixth exemplary embodiment of the novel fastener assembly.

FIG. 8 illustrates another exemplary embodiment of the novel fastener assembly 1 including the screw 2 according to FIG. 1. Only the bush 3 has a slightly different design. The elements of the two narrowing locations 10 and 11 are combined. The impressions 12 are simultaneously designed as resilient elements 15. At one of their ends, they include a non-resilient portion forming the surface elements 13, and in their free end portion, they form the free ends 16 of the resilient elements 15. It is to be understood that the coordination of the elements 13 and 15 has to be carefully chosen. The exemplary embodiment of FIG. 8 also shows that the free ends 16 do not need to be arranged corresponding to the pitch of the thread, but instead to be located on one common circumferential line and in one common circumferential plane, respectively, in an axial direction. The free ends 16 of the resilient elements 15 may be designed to have inclined surfaces being effective in different ways as illustrated such that snapping of the elements 15 over the tips of the threads of the thread 8 is only possible in one direction.

Many variations and modifications may be made to the preferred embodiments of the invention without departing substantially from the spirit and principles of the invention.

All such modifications and variations are intended to be included herein within the scope of the present invention, as defined by the following claims.

I claim:

1. A fastener assembly, comprising:
   a screw,
      said screw including a head, a shank portion and a threaded portion including a thread,
      said shank portion being arranged to face said head and said threaded portion being arranged to face away from said head,
      said shank portion having a diameter and said thread having an outer diameter, the diameter of said shank portion being smaller than the outer diameter of said thread; and
   a bush,
      said bush including a first narrowing location, said first narrowing location having a diameter being smaller than the outer diameter of said thread,
      said bush being captively connected to said screw by said first narrowing location,
      said bush including a second narrowing location, said second narrowing location including at least one resilient element, said at least one resilient element being designed and arranged to elastically engage said thread, and
      said bush including a separation element, said separation element being designed and arranged to continuously extend over said bush in an axial direction.

2. The fastener assembly of claim 1, wherein said bush has an axial length and said threaded portion has an axial length, the length of said bush being greater than the length of said threaded portion.

3. The fastener assembly of claim 1, wherein said at least one resilient element is arranged as close to said first narrowing location in an axial direction that said first and second narrowing location are associated with an end portion of said threaded portion of said screw facing said head of said screw.

4. The fastener assembly of claim 2, wherein said at least one resilient element is arranged as close to said first narrowing location in an axial direction that said first and second narrowing location are associated with an end portion of said threaded portion of said screw facing said head of said screw.

5. The fastener assembly of claim 1, further comprising a plurality of resilient elements, each of said resilient elements having a free end, said thread having a pitch, said free ends being located at said bush in a distributed manner corresponding to the pitch of said thread.

6. The fastener assembly of claim 1, wherein said at least one resilient element has a free end, said free end being designed to be sharp-edged.

7. The fastener assembly of claim 1, wherein said at least one resilient element has a free end, said free end being designed to be rounded.

8. The fastener assembly of claim 1, wherein said first narrowing location is designed and arranged in a way that it forms a feature of said bush serving for automatic determination of an orientation of said bush.

9. The fastener assembly of claim 1, wherein said second narrowing location is designed and arranged in a way that it forms a feature of said bush serving for automatic determination of an orientation of said bush.

10. The fastener assembly of claim 1, wherein said first and second narrowing location are designed and arranged in a way that they form features of said bush serving for automatic determination of an orientation of said bush.

11. The fastener assembly of claim 1, wherein said threaded portion has an end portion facing said head of said screw, said first narrowing location with said end portion forming a non-resilient undercut.

12. The fastener assembly of claim 1, wherein said at least one resilient element engages said thread by friction.

13. The fastener assembly of claim 1, wherein said at least one resilient element engages said thread by a positive fit.

14. A pre-mounted unit, comprising:
   a component including a bore; and
   a fastener assembly, said fastener assembly including:
      a screw,
         said screw including a head, a shank portion and a threaded portion including a thread,
         said shank portion being arranged to face said head and said threaded portion being arranged to face away from said head,
         said shank portion having a diameter and said thread having an outer diameter, the diameter of said shank portion being smaller than the outer diameter of said thread; and
      a bush,
         said bush including a first narrowing location, said first narrowing location having a diameter being smaller than the outer diameter of said thread,
         said bush being captively connected to said screw by said first narrowing location,
         said bush including a second narrowing location, said second narrowing location including at least one resilient element, said at least one resilient element being designed and arranged to elastically engage said thread, and
      said bush including a separation element, said separation element being designed and arranged to continuously extend over said bush in an axial direction,
   said fastener assembly being fixedly arranged in said bore of said component.

* * * * *